United States Patent [19]

Fu et al.

[11] Patent Number: 5,506,769
[45] Date of Patent: Apr. 9, 1996

[54] METHOD FOR ENHANCING VERTICAL RESOLUTION OF NUCLEAR WELL LOGGING INSTRUMENTS

[75] Inventors: Chu-Chiu Fu; Stanley C. Gianzero; David O. Torres, all of Austin, Tex.

[73] Assignee: Halliburton Logging Services, Inc., Houston, Tex.

[21] Appl. No.: 284,920

[22] Filed: Aug. 2, 1994

Related U.S. Application Data

[63] Continuation of Ser. No. 593,450, Oct. 5, 1990, abandoned.

[51] Int. Cl.$^6$ ................................................. G06F 167/00
[52] U.S. Cl. ................... 364/422; 250/269.3; 340/854.6
[58] Field of Search ............................. 364/422; 340/855, 340/853; 367/28, 32; 250/266, 270

[56] References Cited

U.S. PATENT DOCUMENTS

| | | | |
|---|---|---|---|
| 4,445,033 | 4/1984 | Preeg et al. | 250/266 |
| 4,454,420 | 6/1984 | Smith, Jr. | 250/270 |
| 4,475,038 | 10/1984 | Lochmann et al. | 250/256 |
| 4,506,156 | 3/1985 | Mougne | 250/266 |
| 4,825,073 | 4/1989 | Smith, Jr. et al. | 250/260 |
| 4,916,616 | 4/1990 | Freedman et al. | 364/422 |
| 5,210,691 | 5/1993 | Freedman et al. | 364/422 |

Primary Examiner—Gail O. Hayes
Assistant Examiner—Frantzy Poinvil
Attorney, Agent, or Firm—Arnold, White & Durkee

[57] ABSTRACT

A method for enhancing the vertical resolution of a nuclear well logging tool is set forth. A detector of nuclear radiation is moved along a well borehole to produce measurement data r(z) as a function of depth in the borehole. The data r(z) and a system response function g(z) are transformed into spatial frequency domain (f) counterparts of r(z) and g(z), the counterparts being R(f) and G(f). A window W(f) in the spatial frequency domain based on the function R(f) is defined. That smoothly eliminates the high frequency noise. A new profile function P(f) is obtained by dividing the filtered R(f) by the function G(f) to deconvolve R(f). The inverse Fourier transform of P(f) yields a vertically enhanced profile p(z) in the depth domain.

14 Claims, 14 Drawing Sheets

METHOD FOR ENHANCING VERTICAL RESOLUTION OF NUCLEAR WELL LOGGING INSTRUMENTS

This application is a continuation of application Ser. No. 07/593,450, filed Oct. 5, 1990, now abandoned.

BACKGROUND OF THE DISCLOSURE

This invention relates to nuclear well logging and, more particularly, to methods for enhancing the vertical resolution of nuclear logging instruments.

Nuclear well logging tools usually employ detector systems such as gas filled tubes or scintillation detectors for counting either neutrons or gamma rays. These devices are event sensitive in the sense that an event such as passage of a gamma ray or neutron through the detector generates a discrete output or count of its occurrence. The events may occur at high frequency or low frequency depending on the source of the radiation being detected and other factors. But, in any case, the counts of the detector occur in a random, unpredictable time sequence and are summed, accumulated or integrated over a time or depth interval. Thus, the data for a particular time or depth interval is represented by a number of counts having a statistical uncertainty associated with it.

The nuclear logging tool outputs are typically sampled on a depth basis in most commercial well logging systems. Material intervening between the nuclear source and the detector of course alters the vertical response of the device. The system response function which is a characteristic of a particular logging tool geometry, collimation, source detector spacing, shielding, etc. also impacts the vertical response of the device. Generally, the vertical response has been thought of as being limited primarily by the source-detector spacing in the past. Movement of the logging tool through the borehole as measurements are made also blurs response to adjacent formations and further integrates or averages physical properties of the formation sought to be measured such as gamma ray activity, formation density and formation porosity.

BRIEF DESCRIPTION OF THE INVENTION

The techniques and methods of the present invention propose to enhance the vertical resolution of any common type of nuclear well logging tool or device by an appropriate processing of its output combining deconvolution and windowing performed in the spatial frequency domain. The Fast Fourier Transform (FFT) is used to bridge the device output between the depth (z) and the spatial frequency (f) domains.

More specifically, an assumed Gaussian system response function in conjunction with a modified Blackman window is utilized to enhance the signal and reduce statistical noise. A brief summary of the application of the technique may be described as follows. The FFT is used to transfer from the depth domain (z) the device output response and the Gaussian system response function into their spatial frequency domain (f) counterparts. An appropriately modified Blackman window is chosen in the spatial frequency domain based on the FFT of the original tool response as a function of depth (i.e., the log). A profile of the windowed convolved response function is then calculated in the frequency domain. Finally, an inverse FFT of the windowed convolved response function of the previous step is obtained to determine p(z), the vertically enhanced log profile back in the depth (z) domain.

The methods of the present invention may best be understood by reference to the following detailed description taken in conjunction with the appended drawings. It will be appreciated that the description and drawings may admit to other embodiments of the invention and are to be taken as illustrative only and not as limitative on the concepts of the invention.

DETAILED DESCRIPTION OF THE PREFERRED EMBODIMENT

Figure 10:
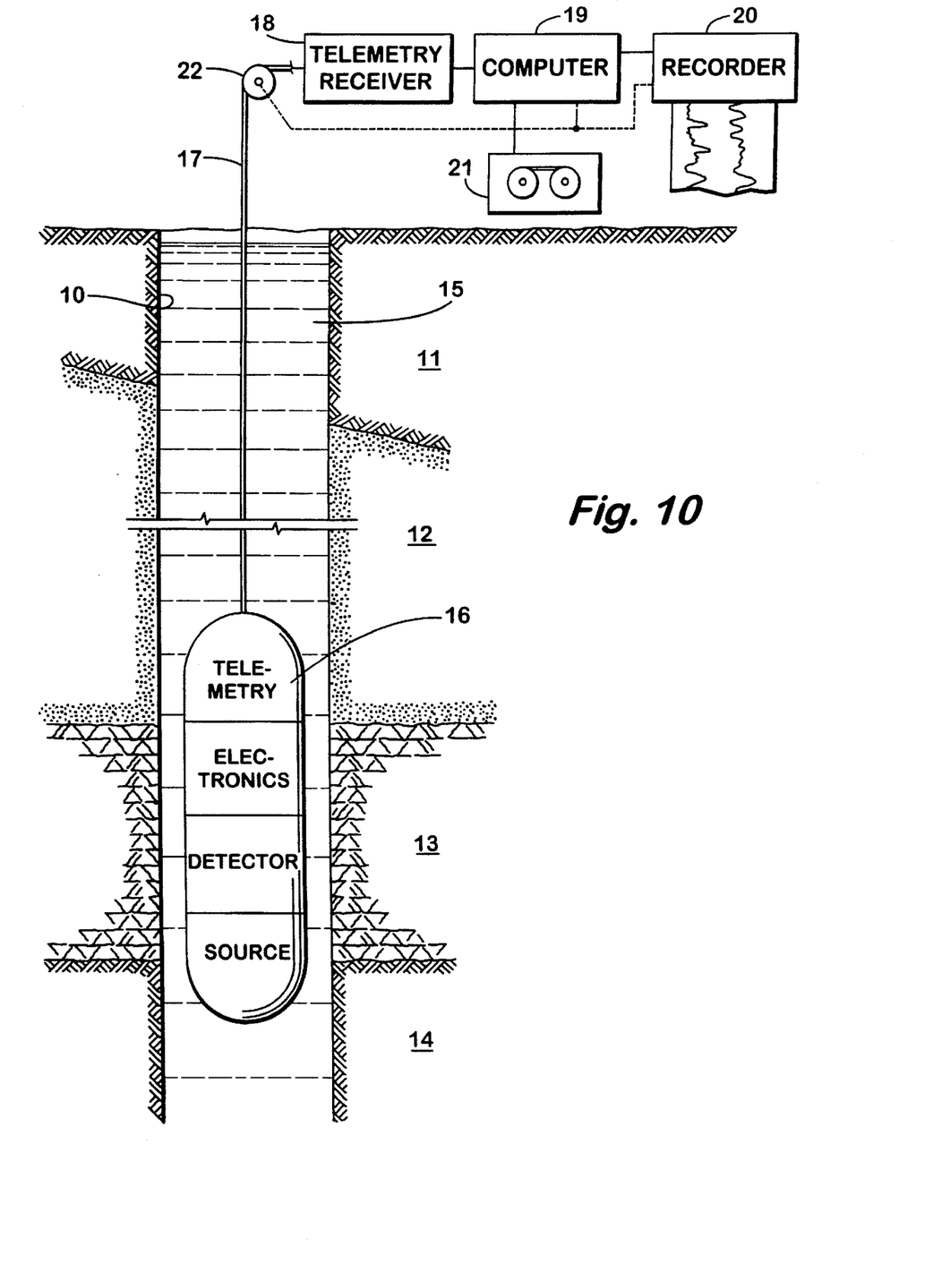
FIG. 10 is a schematic diagram depicting a typical well logging system.

Referring initially to FIG. 10 of the drawings, a typical well logging system layout is shown schematically. A well borehole 10 penetrates earth formations 11, 12, 13 and 14 and is filled with a borehole fluid 15. A nuclear well logging instrument 16 is suspended in the borehole 10 by a winch arrangement (not shown) via a well logging cable 17. The logging cable 17 is an armored, load bearing type having from one to several inner conductors for communicating electrical signals to and from the downhole tool 16.

The downhole tool contains a source S of nuclear radiation which may be typically neutron or gamma rays, a longitudinally spaced detector D, an electronic section E for control of the tool and a telemetry section TLM for sending signals to surface equipment and for receiving control signals from the surface equipment. As the tool 16 is moved vertically through the borehole 10, characteristics of the earth formations 11, 12 13 and 14 may be measured and sent via the cable 17 to the telemetry receiver 18 at the surface.

The telemetry receiver 18 decodes and formats the data appropriately for input to a computer 19 wherein processing according to concepts of the present invention may be performed by appropriate programs utilizing the methods of the present invention. The computer 19 will then output processed results to a recorder 20 or a tape unit 21 for recording as a function of borehole 10 depth. Depth information is supplied to the computer 19 and the recorder 20 from a sheave or measuring wheel depicted schematically at 22. Movement of the cable 17 across the wheel 22 generates depth pulses or information in a manner known in the art.

The log measurement process blurs the formation and averages the properties over some finite depth. The blurring effect mainly depends on the system response function. Deconvolution is a technique used to reduce the blurring effect of the detector, thereby improving the vertical resolution of the log measurement. A simple and applicable Gaussian function is used as the system response function to be deconvolved with the log. Because the deconvolution generally amplifies the high-frequency noise, it must be truncated. However, directly truncating the high-frequency noise introduces some ripples on the log. These ripples are reduced by a smooth truncation procedure called "windowing", but at the cost of losing some signal. Window characteristics in the depth and the spatial frequency domain show how to filter the noise or ripples and preserve the maximum vertical resolution.

The vertical resolution of a logging tool depends on the system response function, which is defined as the depth domain response to a delta function input (an idealized, infinitely thin layer of formation). If the system response function can be well defined, it may be possible to sharpen or enhance the log measurement by deconvolution. Unfortunately, nuclear data are inherently noisy and the exact system response function for nuclear tools is usually unknown.

In the case of γ-ray logging, it has been shown by J. G. Conaway and P. G. Killeen, in "Quantitative Determination from Gamma Ray Logs by Application of Digital Time Series Analysis," *Geophysics*, v. 43, pp 1204–1221, that a very accurate representation of the intrinisic system function is the convolution of a cusp and a box function which is related to the detector spacing.

On the other hand, a Gaussian system function with a variance being a function of the average migration length of the formation was found to be a reasonably accurate system function for neutron porosity tools, see Michael P. Smith, "Enhanced Vertical Resolution Processing of Dual Spaced Neutron and Density Tools Using Standard Shop Calibrations and Borehole Compensation Procedures," *SPWLA* 1990. In the former case, the spectra of the Gaussian and the cusp-box function differ only in the high frequency range which we intend to truncate in our procedure. Consequently, a Gaussian function is a reasonable approximation to the system function for nuclear tools.

In conjunction with this system function, we have chosen a windowing procedure that suppresses the noise while maintaining maximum vertical resolution. This leads to a Gaussian function, $$g(z) = \frac{\alpha}{\sqrt{\pi}} e^{-\alpha^2 z^2} \quad (1)$$

which was used as the system response function to be deconvolved with the data and the modified Blackman window was used as a filter for all the data processing. The exponential coefficient α in the Gaussian function of Equation 1 is equal to 1.66/FWHM, where FWHM is the full width of the Gaussian at its half maximum. The value of FWHM can be estimated from the tool response. For example, FWHM is about half of the transition length (10% to 90% point) at a boundary.

Two sets of simulated data with various thickness beds were generated to verify the effect of the deconvolution and windowing technique. This technique is applied to the laboratory induced γ ray spectrum and the log data from neutron porosity tool, density tool, and natural gamma ray measurement to demonstrate its capability.

The Fast Fourier transform (FFT) makes deconvolution and windowing performed in the spatial frequency domain possible and more efficient. A signal, the response of the measuring instrument, is represented mathematically as a function of an independent variable (such as time or depth). In well logging the independent variable is usually depth; therefore, log data are referred to as depth domain signals. Through the FFT, the signal in the depth domain can be converted to the spatial frequency domain.

The responses of the logging measurement in the depth domain, denoted as r(z), can be described as convolving the formation profile, p(z), with the intrinsic system function, s(z) where z is the depth. Mathematically;

$$r(z) = p(z) * s(z) = \int_{-\infty}^{+\infty} p(z')s(z-z')dz' \quad (2)$$

where * represents a convolution.

For linear invariant systems, the previous convolution product in the depth domain can be replaced by a simple multiplication product in the spatial frequency domain. Although it is well known that the system functions for most nuclear logging tools vary with the formation properties, it will be assumed that the error made in maintaining invariance is small compared to the statistical variations of the signal. Therefore, the relationship in Equation (2) can be described in the spatial frequency domain as:

$$R(f) = P(f) \cdot S(f) \quad (3)$$

Capital letters (e.g., Equation 3) indicate the corresponding spatial frequency domain function. The spatial frequency f is defined in cycles per unit depth.

The symbols, r(z) and R(f), p(z) and P(f), s(z) and S(f) are called Fourier transform pairs, where the transform process connecting a pair is denoted as r(z) ↔ R(f);

p(z) ↔ P(f); and s(z) ↔ S(f).

Fourier transform pairs satisfy the following relationships:

$$S(f) = \int_{-\infty}^{+\infty} s(z)e^{-i2\pi fz} dz \quad (4)$$

$$s(z) = \int_{-\infty}^{+\infty} S(f)e^{i2\pi fz} df \quad (5)$$

Theoretically, the formation profile in the spatial frequency domain can be obtained by simply dividing the spatial frequency response of the tool by the transfer system function (the Fourier transform of the system function):

$$P(f) = R(f) \cdot \frac{1}{S(f)} \quad (6)$$

The actual formation profile in the depth domain is obtained by taking the inverse transform of the above, which is deconvolution. One problem may occur when the system response function is not well defined or noise exists in the log. There is an optimum filter to be used to deconvolve the signal in a noisy environment. The Weiner filter, $\overline{W}(f)$, is given by Equation 7:

$$\overline{W}(f) = \frac{S^*(f)}{|S(f)|^2 + \frac{|N(f)|^2}{|P(f)|^2}} \quad (7)$$

where the numerator is the complex conjugate and N(f) is the spectra of the noise.

It is apparent that, whenever the noise power ($|N(f)|^2$) is large compared with the input power $|P(f)|^2$, the Weiner filter vanishes. On the other hand, if the input power at some frequencies is much greater than the corresponding noise power, then, $\overline{W}$ approaches the reciprocal of S(f) which agrees with Equation (6). Since the input power and noise spectra are usually unknown in a logging environment, the implementation of the Weiner filter is impractical.

The filter used in the methods of the present invention is surprisingly useful and easily understood. Furthermore, the results from an application of this filter are less noisy and possesses much better definition than the original data. If G(f) is the Gaussian transfer function to be deconvolved with the log data, then the deconvolved results in the frequency domain P'(f) can be expressed as:

$$P'(f) = R(f) \cdot \frac{1}{G(f)} \qquad (8)$$

The actual profile can be completely recovered (P'(f)=P(f)), only if the Gaussian function is identical to the intrinsic system function and no noise exists in the log. The noises will be amplified for the high spatial frequency f at which G(f) approaches zero. A window in the spatial frequency domain should be used to reduce these high-frequency noises by setting an upper frequency limit and to compensate for differences between the intrinsic system function and the Gaussian function. Then, Equation (6) can be revised as:

$$P(f) = R(f) \cdot \frac{W(f)}{G(f)} \qquad (9)$$

where, W(f) is called the windowing transfer function. The upper limit frequency is called cutoff frequency. W(f)=0, when the frequency f is equal to or larger than cutoff frequency. W(f)/G(f) is sometimes called the deconvolution filter. The procedures for this technique are summarized as follows:

(1) Use the FFT to transfer measurement response, r(z), and Gaussian system function, g(z), to the spatial frequency domain as R(f) and G(f);

(2) Choose the proper window, W(f), in spatial frequency domain;

(3) Calculate P(f)=W(f)R(f)/G(f) for discrete frequencies; and (4) Take the inverse FFT of P(f) to obtain p(z).

As mentioned previously, windowing is used to suppress high-frequency noises. A step function truncation of the Fourier series will lead to the well-known Gibbs phenomenon, (i.e., a fixed percentage overshoot and ripple around a discontinuity). In the theory of Fourier series, the Gibbs phenomenon can be moderated through the use of a less abrupt truncation of the Fourier series. Since the multiplication of Fourier coefficients by a window corresponds to convolving the signal response with the Fourier transform of the window, a design objective is to find a finite window whose Fourier transform has relatively small side lobes and narrow main lobe.

FIGS. 1A–H and 2A–H show several different kinds of windows in the spatial frequency domain on the left and their Fourier transform on the right of the views. From the relation of Fourier transform pairs, Equation (5) can be written for window pairs as:

$$\omega(0) = \int_{-\infty}^{+\infty} W(f) df \qquad (10)$$

i.e., the peak height of the main lobe on the right plot will be equal to the area under the window curve on the left. The rectangular window at the top left corresponds to the step function truncation of the Fourier series. The Fourier transform of the rectangular window, shown at the top right, has a narrow main lobe, but has side lobes which contain a large part of the total energy and decay very slowly.

The other three windows are modified Blackman windows, which are represented as:

$$W(n) = 1, \qquad 0 \leq n < n_i \qquad (11)$$

$$W(n) = 0.42 + 0.5\cos\left[\frac{\pi(n - n_i)}{n_c - n_i}\right] + \qquad (12)$$

$$0.08\cos\left[\frac{2\pi(n - n_i)}{n_c - n_i}\right] \qquad n_i \leq n < n_c$$

$$W(n) = 0, \qquad n \geq n_c \qquad (13)$$

where $n_i$ is the frequency sample number at the start of the transition zone, and $n_c$ is the frequency sample number at the cutoff frequency. The fourth one is generally called the Blackman window, which is the special case of the modified Blackman window with $n_i$=0.

In FIGS. 1A–H, the four windows have the same cutoff frequency ($n_c$=100) with different starting points for the transition zone. The area under each window curve in the spatial frequency domain is decreased from the top to the bottom. The peak height of the main lobe in the transform is proportional to the area under the window curve. The larger the peak height of the main lobe is, the narrower the main lobe width will be. The peak height of the side lobes depends on the degree of sharpness in the spatial frequency domain transition zone. The less sharp the transition is, the smaller the side lobes will be.

The windows with different cutoffs shown in FIGS. 2A–H have the same area under the curves. The peak height of the main lobe in their transforms is the same (i.e., the vertical resolution in the depth domain is the same for these four windows). The side lobes diminish for the (unmodified) Blackman window. The Blackman window provides the best performance in terms of obtaining the maximum peak height of the main lobe and least peak height of the side lobes, but only if its cutoff frequency is 2.5 times that of the rectangular window. Unfortunately, in real logs, because of the resolution limitation of the detector and noise in the signal, it is difficult to extend the cutoff and frequency of the Blackman window to get maximum resolution without increasing the noise. A satisfactory compromise between the resolution and ripples (noise) is obtained by using the modified Blackman window with suitable adjustments of $n_i$ and $n_c$.

Figure 1A:
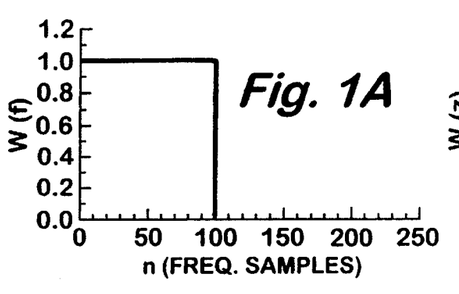
FIGS. 1A through H depict various frequency domain windows and the associated FFTs.
Figure 1B:
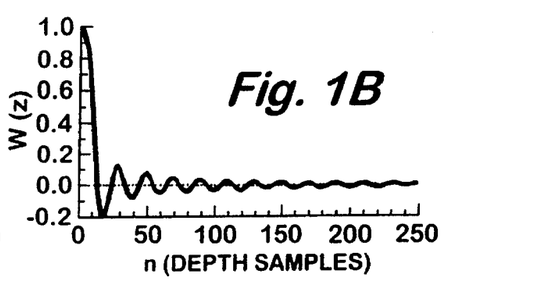
Figure 1C:
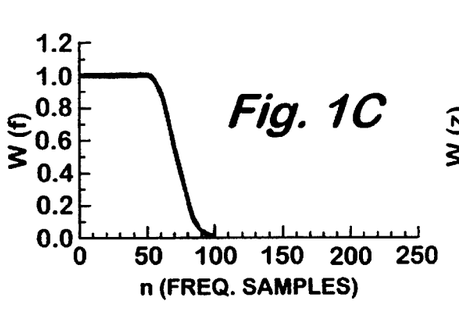
Figure 1D:
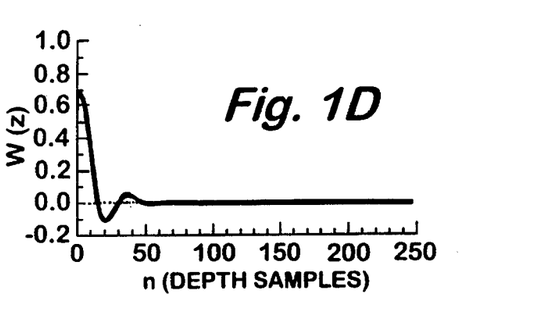
Figure 1E:
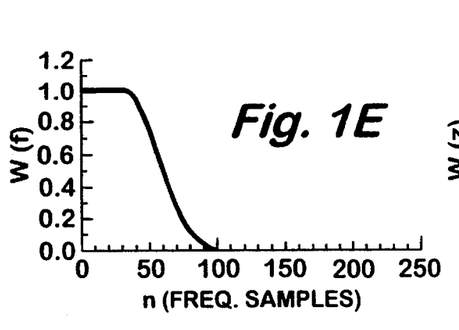
Figure 1F:
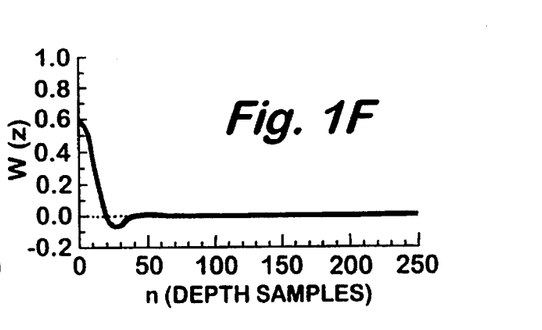
Figure 1G:
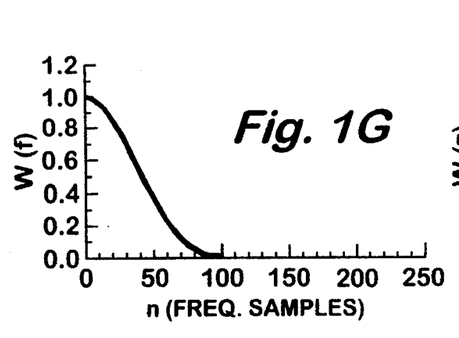
Figure 1H:
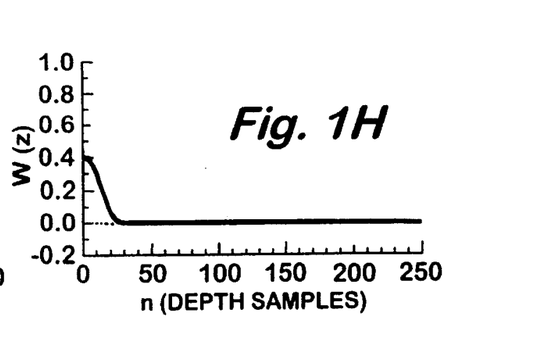
Figure 2A:
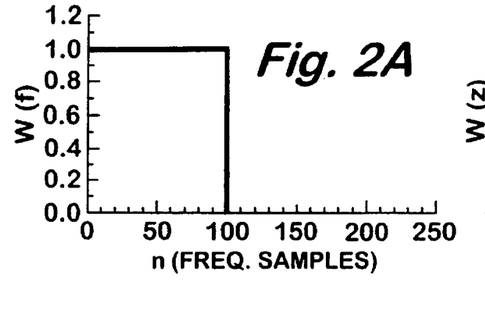
FIGS. 2A through H depict various frequency domain windows and the associated FFTs.
Figure 2B:
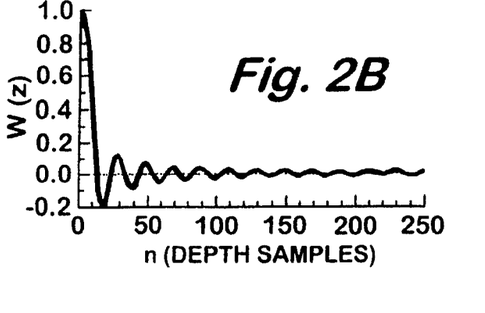
Figure 2C:
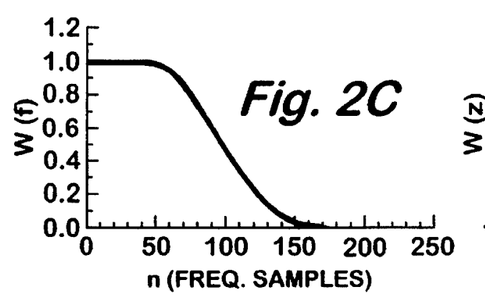
Figure 2D:
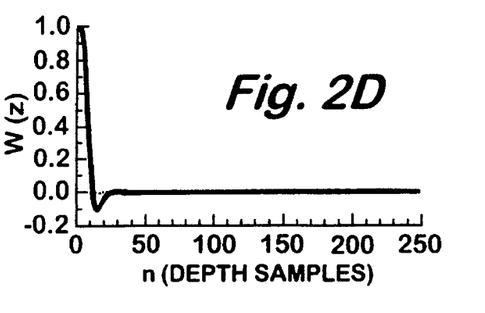
Figure 2E:
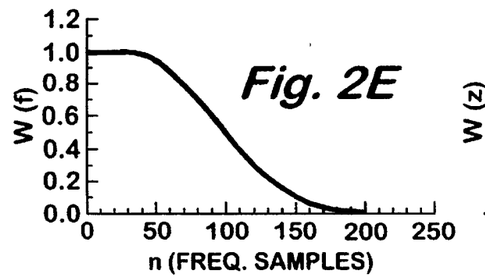
Figure 2F:
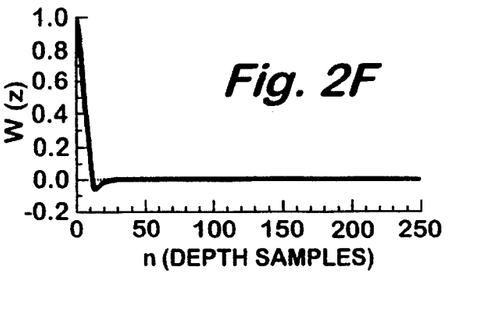
Figure 2G:
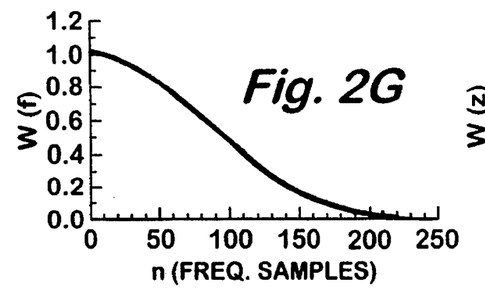
Figure 2H:
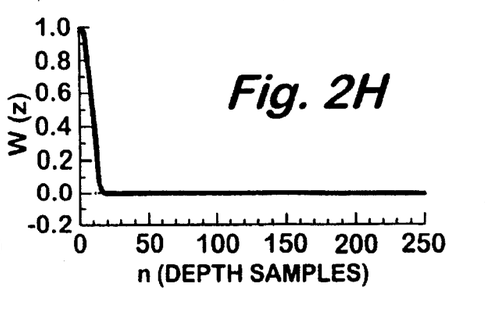
Figure 3A:
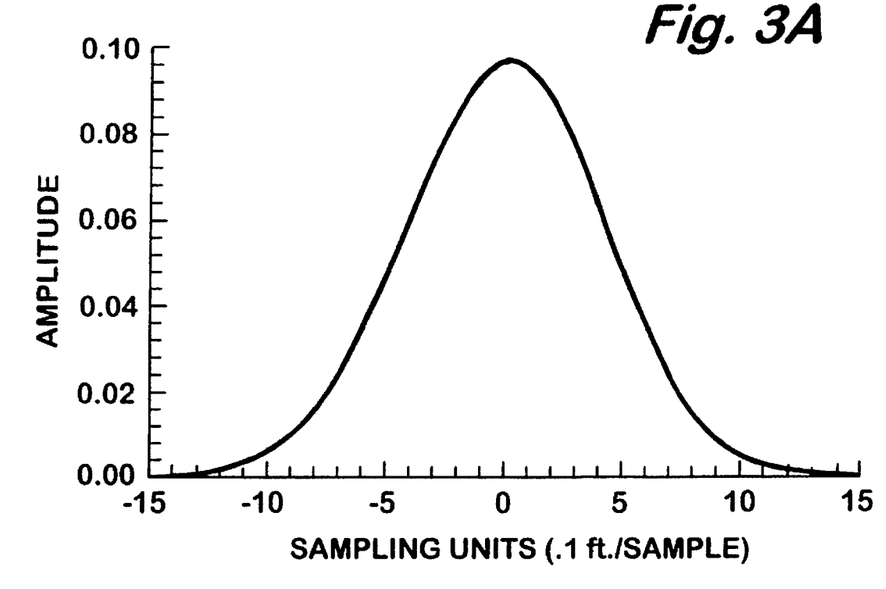
FIGS. 3A and B depict a Gaussian system function and a box-cusp function.
Figure 4A:
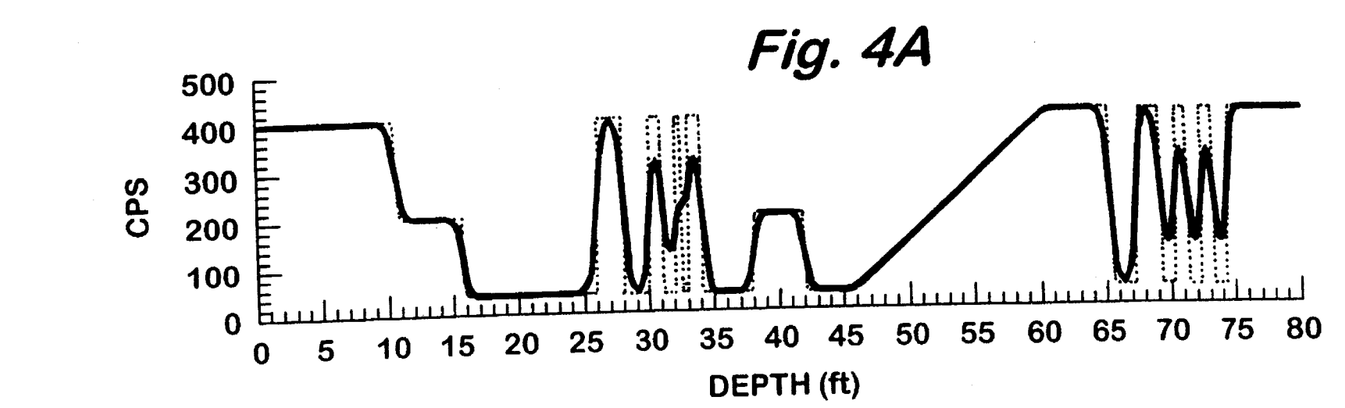
FIGS. 4A, B, C and D depict simulated data and deconvolved data with and without noise.
Figure 4B:
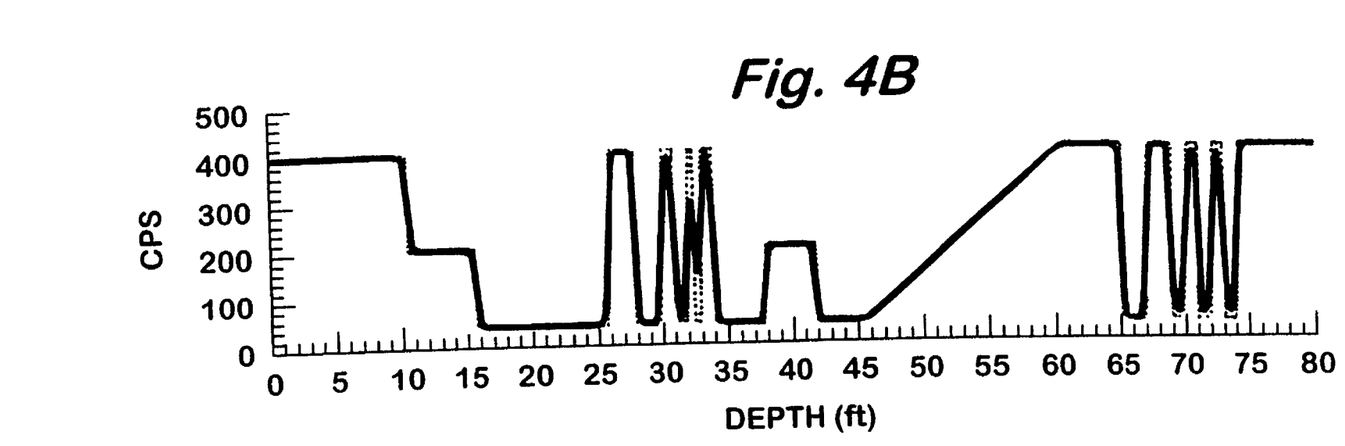

The dotted line in FIGS. 4A–D shows an arbitrary intrinsic formation profile in counts per second (CPS) versus depth. The solid curve in FIG. 4A is the noise-free simulated data which was obtained by convolving the formation profile sampled at 0.1 feet with the Gaussian system function (FWHM= 1.0 feet) shown in FIG. 3A. The solid curve in FIG. 4B is the deconvolution result of the noise-free data. The same Gaussian function with more samples was used as the deconvolver. The result shows the vertical resolution of all the beds is enhanced. The center bed readings reach the true value, except the 0.5' bed. Notice that there are no overshoots.

Figure 4C:
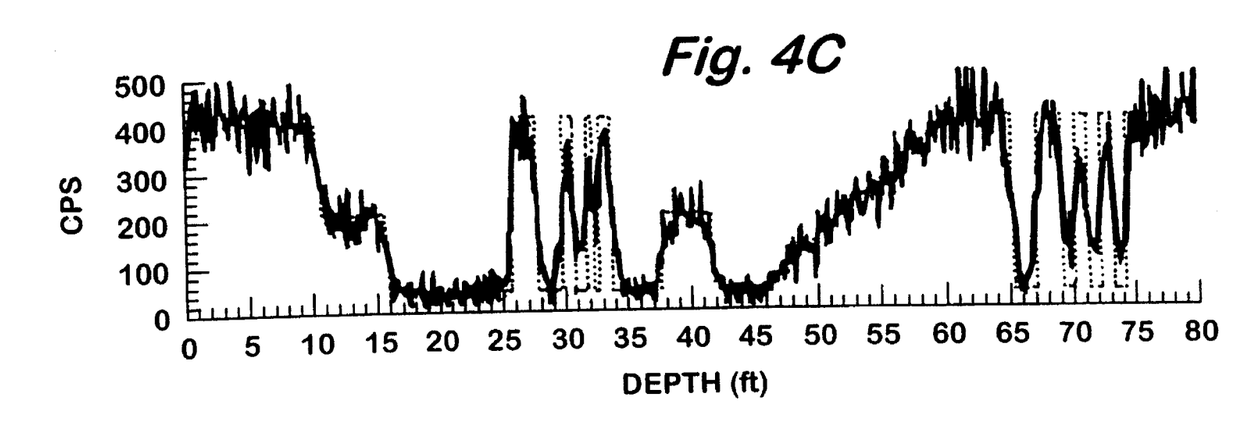
Figure 4D:
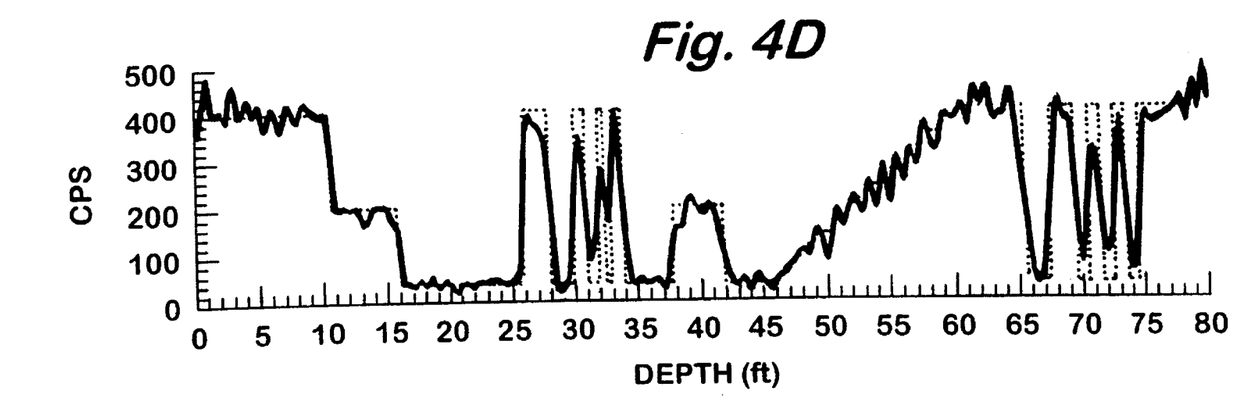

FIG. 4C illustrates the case where random noise, based on counts per sample assuming a logging speed of 30'/min, was added to the noise-free simulated data. FIG. 4D indicates that the vertical resolution is enhanced and the noise is reduced.

Figure 3B:
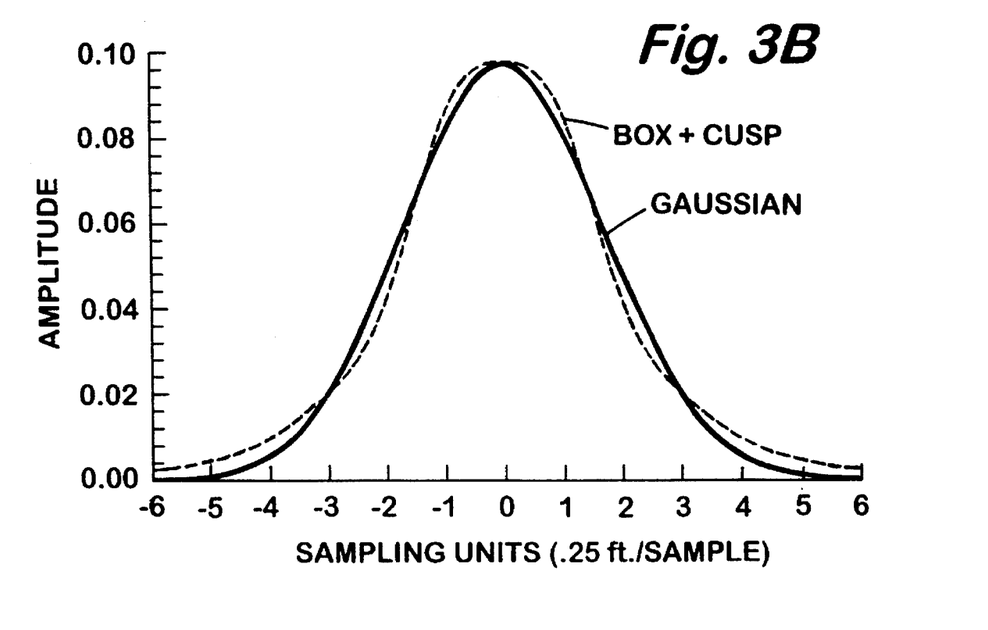
Figure 5A:
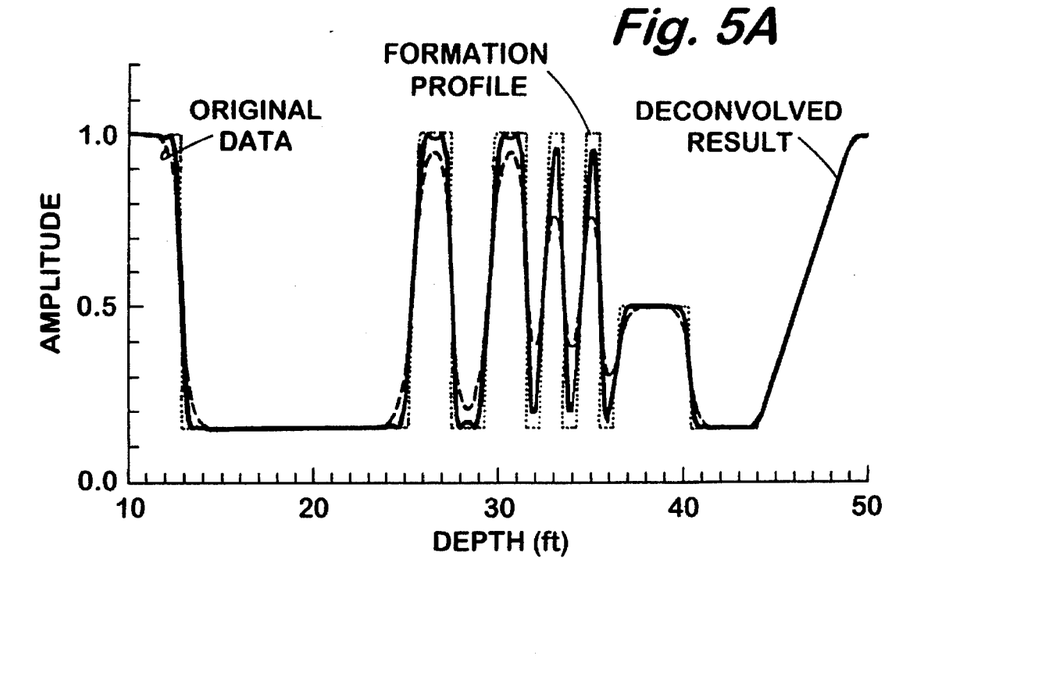
FIGS. 5A and B depict simulated data with and without noise and related deconvolved results.

Another simulated log profile is denoted via FIG. 5A by the dotted line. The dashed curve in this figure is the noise-free data, which was obtained by convolving the profile sampled at 0.25' with the box-plus-cusp functions (dashed line in FIG. 3B). The deconvolver is the Gaussian function with a FWHM of 4 samples (solid line in FIG. 3B). The deconvolved results of the noise-free data (solid curve) shows a very good enhancement of the vertical resolution for all the beds. The essential reason for using the box-plus-cusp system function, which is a better approximation to the system function, was to indicate the robustness of the Gaussian deconvolution procedure.

Figure 5B:
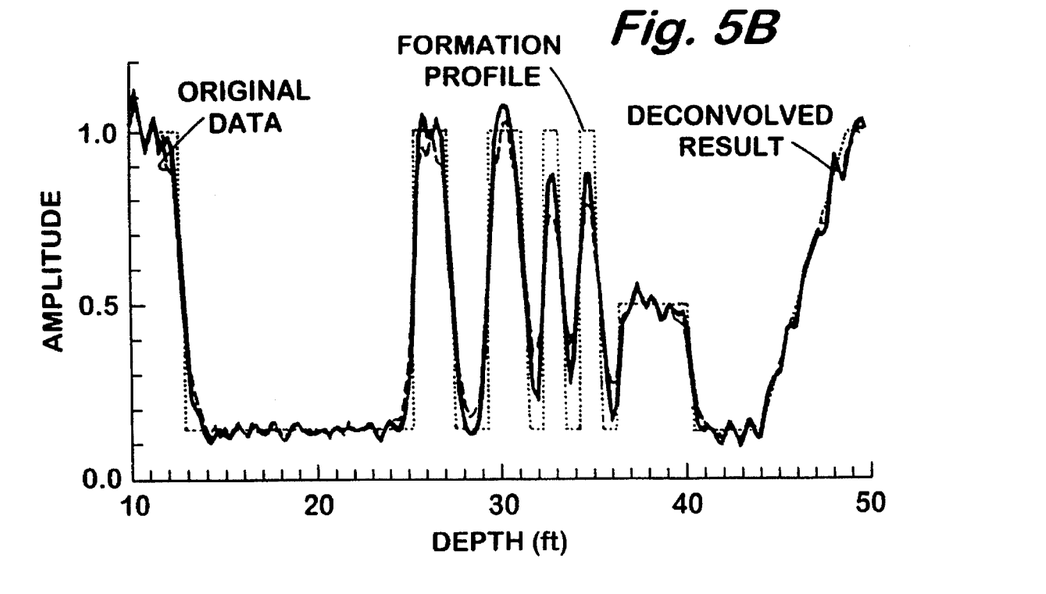
Figure 6A:
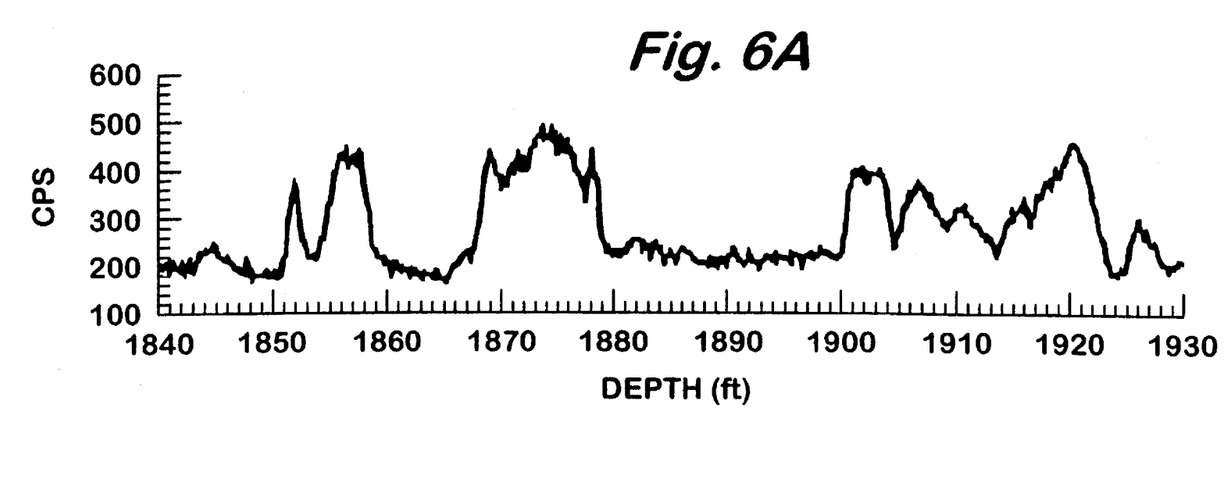
FIGS. 6A, B, C and D depict compensated neutron porosity tool data in processed and unprocessed form.
Figure 6B:
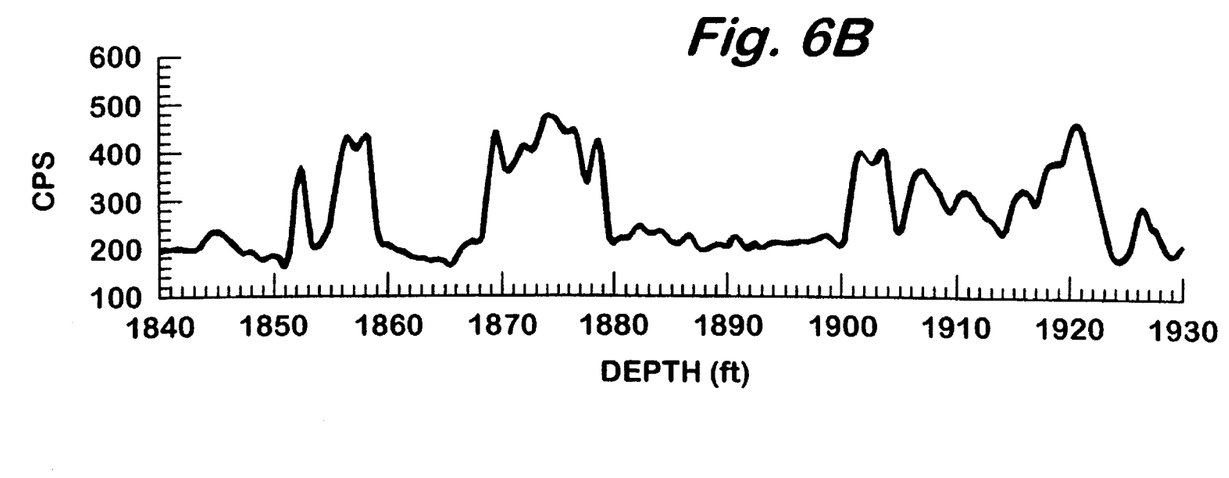
Figure 6C:
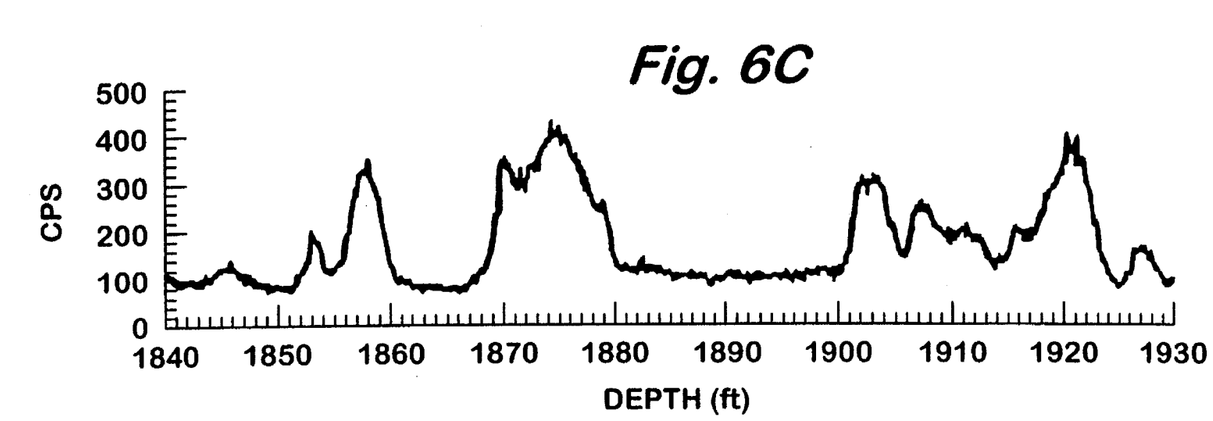
Figure 6D:
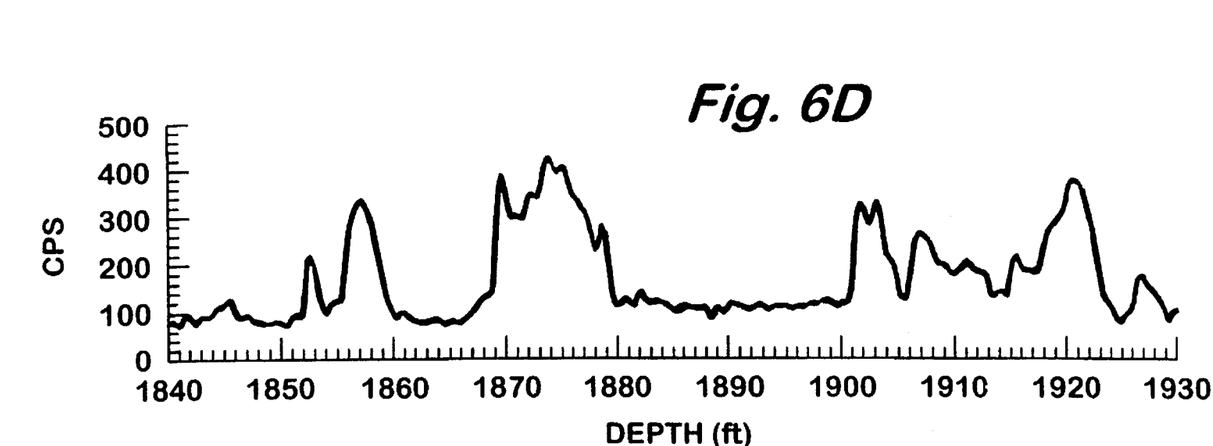
Figure 7A:
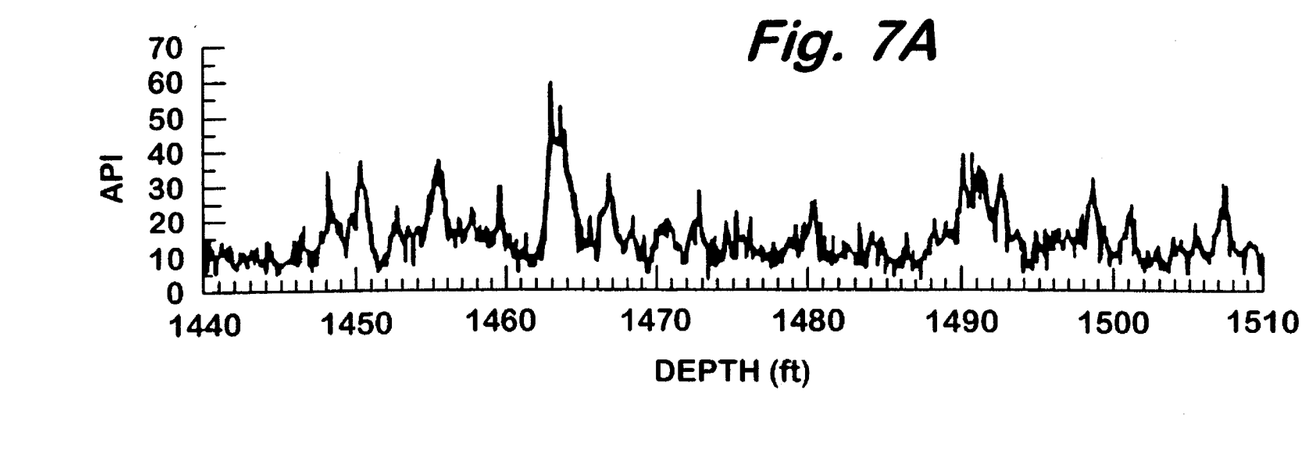
FIGS. 7A, B, C and D depict natural gamma ray tool data in processed and unprocessed form.
Figure 7B:
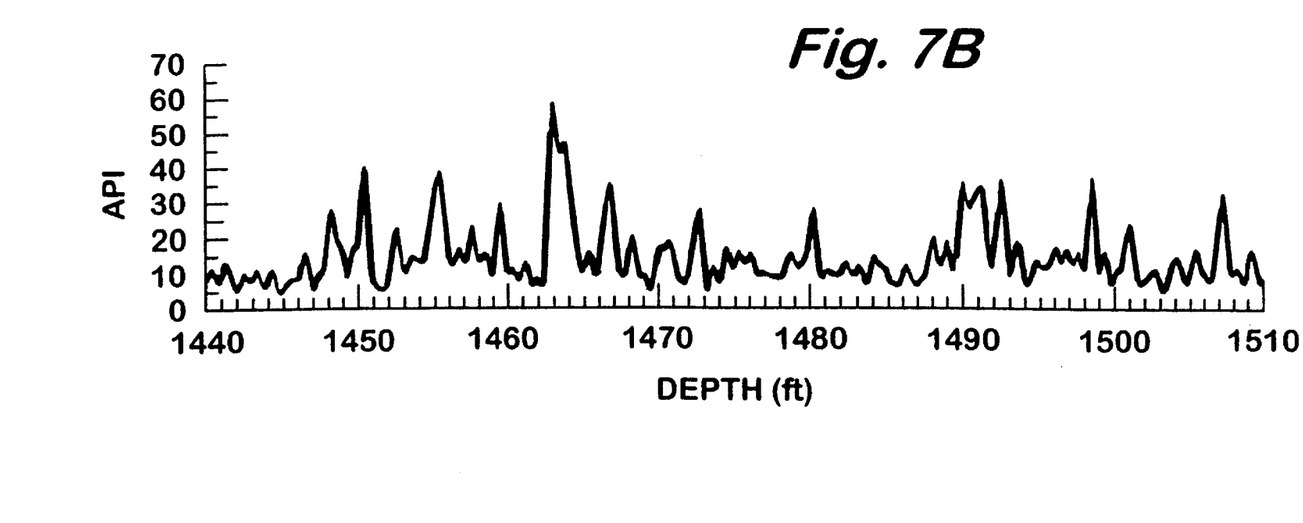
Figure 7C:
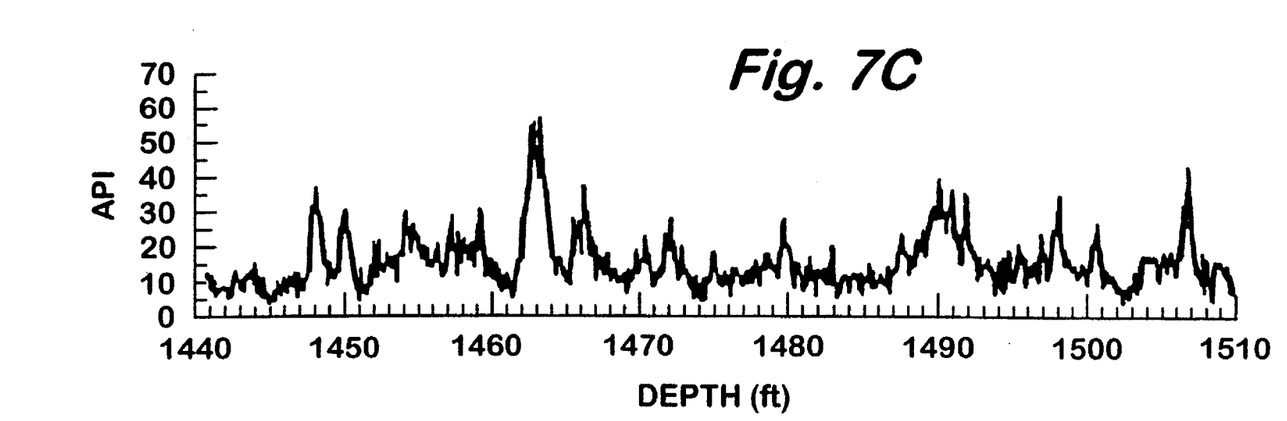
Figure 7D:
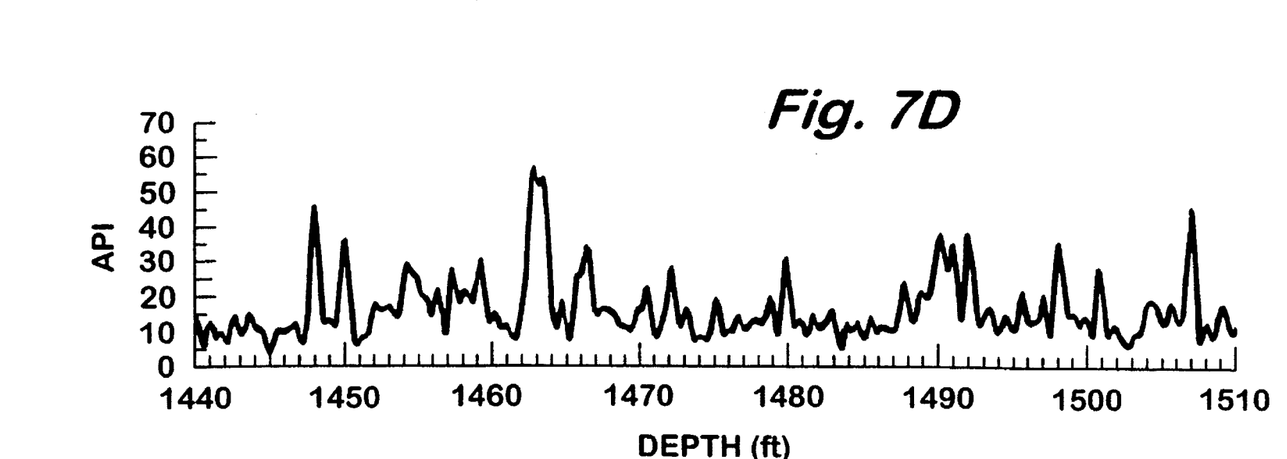
Figure 8A:
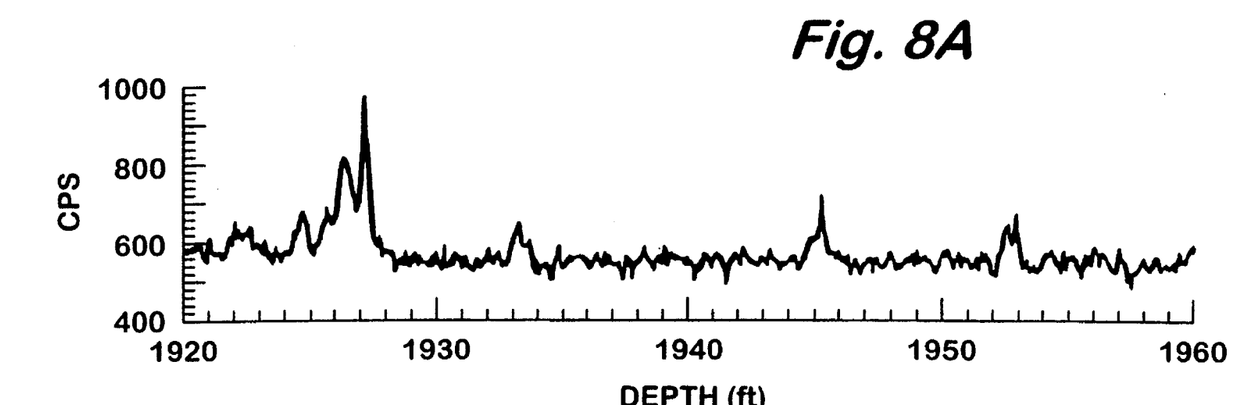
FIGS. 8A, B, C and D depict compensated density logging tool data in processed and unprocessed form.
Figure 8B:
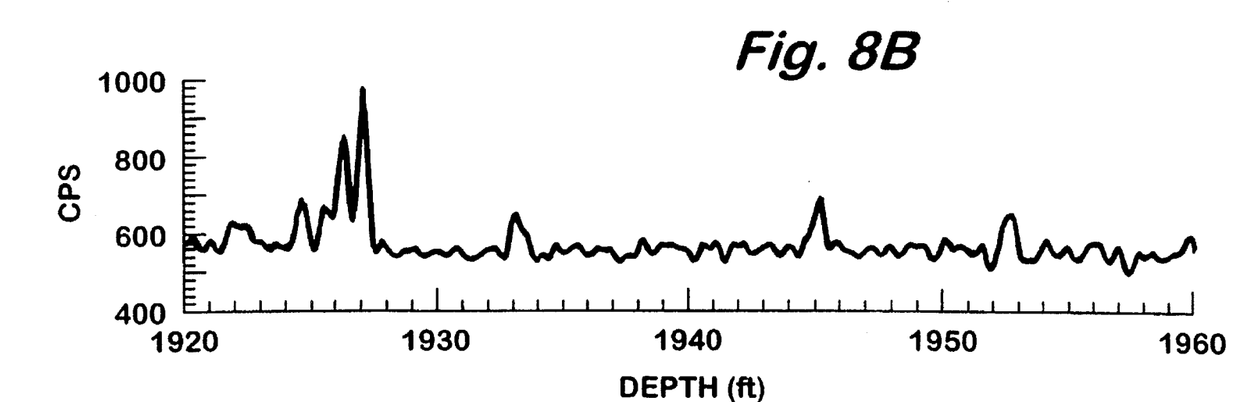
Figure 8C:
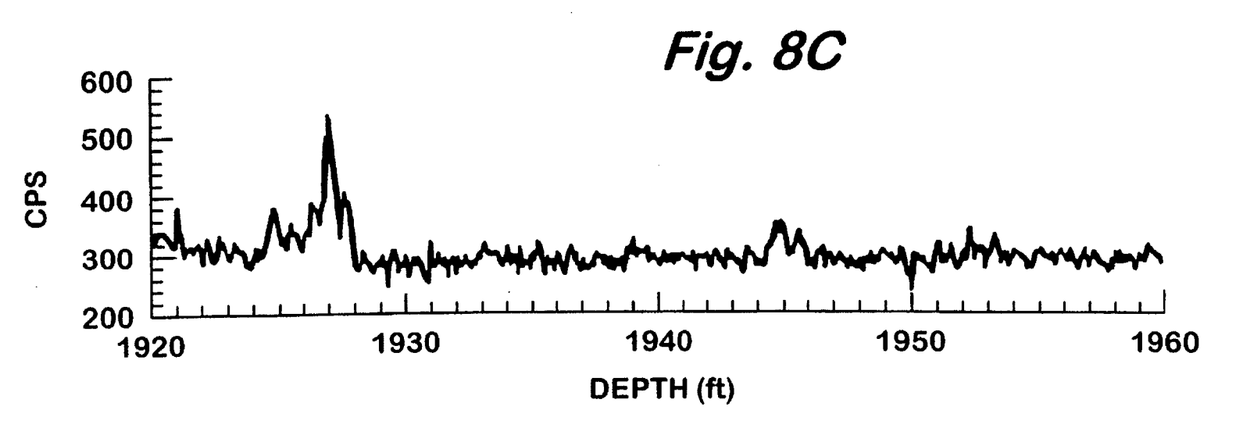
Figure 8D:
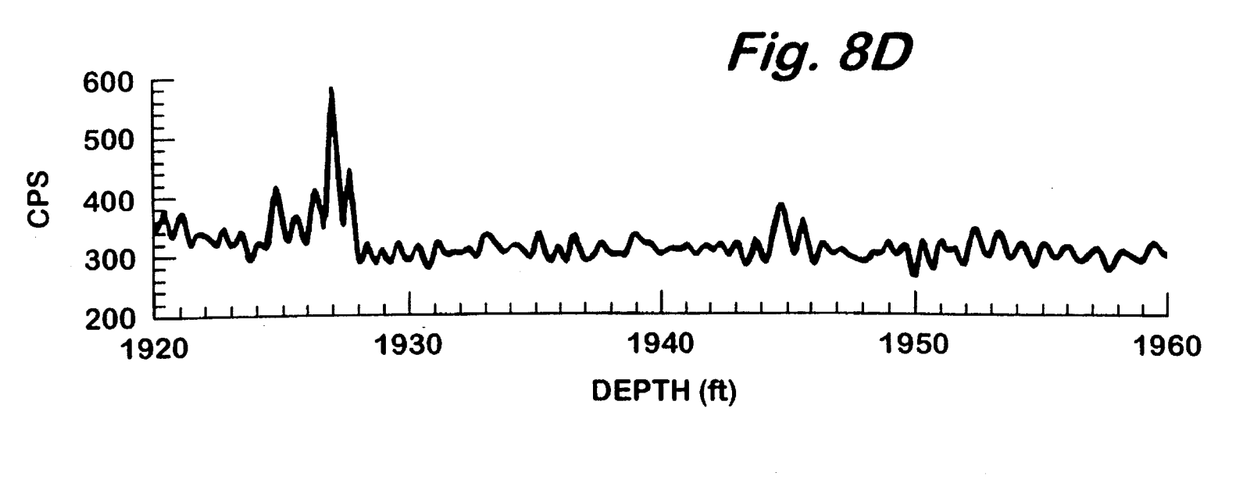

FIG. 5B shows the same formation with noisy data and the deconvolved results. Except for a slight overshoot on the 2' bed at a depth of 30', which is caused by noise amplification, the vertical resolution of all the beds was improved.

The results of the simulated data show that the deconvolution and windowing technique can be successfully used to enhance the vertical resolution and reduce the noise if the system function is well defined.

FIGS. 6A–D show the raw data from a compensated neutron tool near and far detectors at 0.1' sample rate and the deconvolution results with a modified Blackman window. A Gaussian system function with a FWHM of 10 and 7 samples was used for far and near data, respectively. The deconvolved logs are sharper and cleaner than the raw data logs. The thin beds at depths 1852', 1869' and 1879' show the discernible enhancement.

FIGS. 7A–D shows two sets of raw data within the same depth region from the natural gamma ray tool at a 0.1 feet sample rate and the deconvolved results with a modified Blackman window. A Gaussian system function with a FWHM of 7 samples was used. Notice, in the deconvolved results, the vertical resolution is enhanced, the noise is reduced and the thin beds become sharper.

FIGS. 8A–D show the raw data of the near and the far detectors from a compensated density log (CDL) tool at a 0.1 feet sample rate and the deconvolved results. Sodium iodide detectors are used for the CDL tool. A Gaussian system function with a FWHM of 6 and 5 samples was used for far (FCDL) and near (NCDL) data, respectively. The log is cleaner and possesses some noticeable thin bed enhancements at the depths 1924.8', 1926.2', 1926.9', and 1927.6'.

Figure 9A:
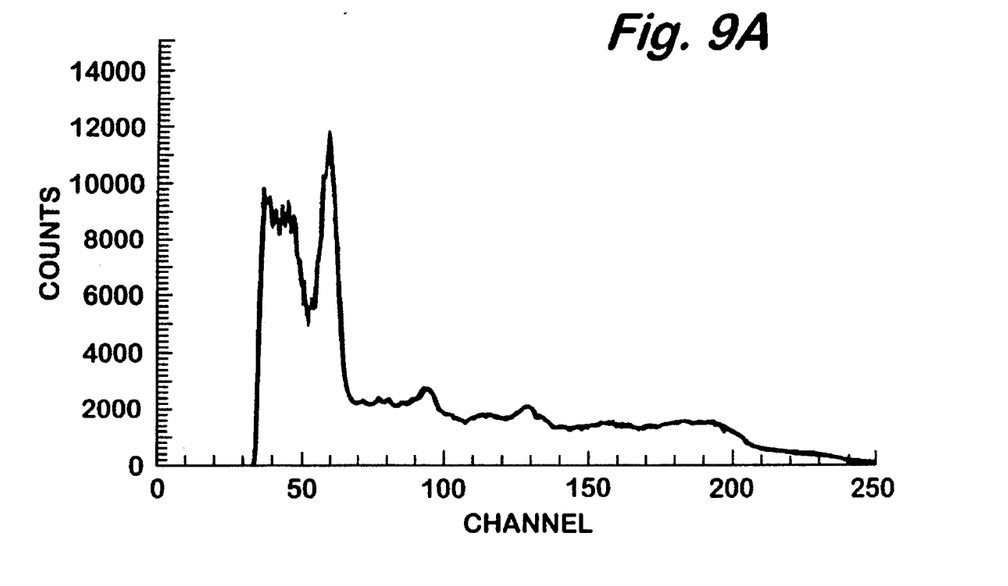
FIGS. 9A and B depict gamma ray spectral tool data in processed and unprocessed form.
Figure 9B:
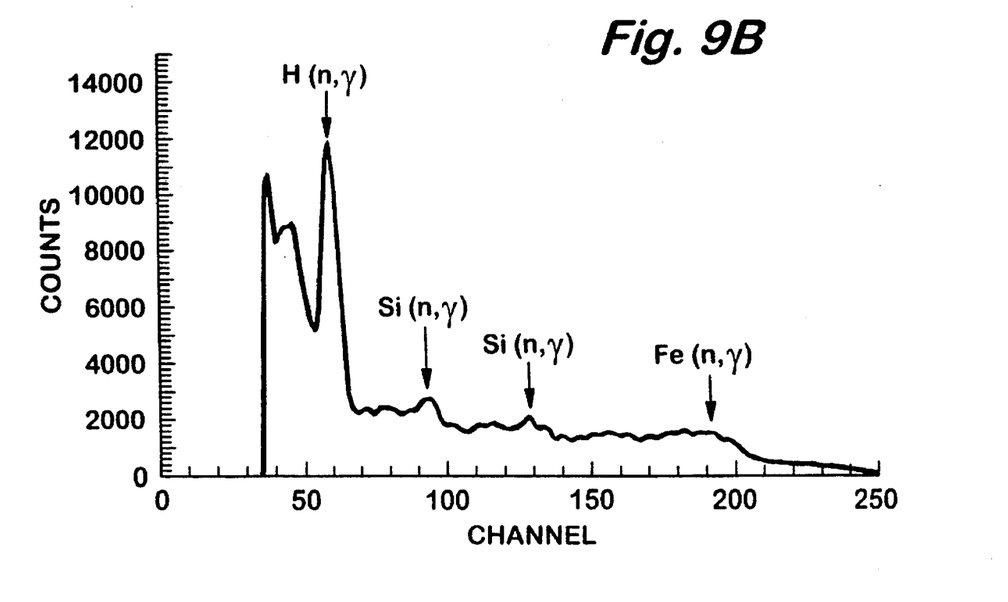

In the top of FIG. 9 is the raw data of a laboratory induced γ-ray spectrum obtained in a 20% water-filled sandstone formation with an 8" borehole. The deconvolved spectrum using a modified Blackman window is shown in the bottom of the same figure. The FWHM value of the Gaussian system function is 5 sample units. Notice, that the deconvolved result provides a better resolved set of data with reduced statistical variations.

The results of the simulated, laboratory and nuclear log data show that deconvolution and windowing technique can enhance the vertical resolution of the thin beds, sharpen the boundary of the beds (thicker than 2') without degrading the center bed reading, and reduce the noise. A simple Gaussian function is appropriate as the system response function for the nuclear tools described here. Moreover, the bandwidth of the modified Blackman window is readily obtained from the Fourier transform of the recorded log data.

The foregoing description may make other changes and modifications of the techniques of the present invention apparent to those of skill in the art. The aim of the appended claims is to cover all such changes and modifications as fall within the true spirit and scope of the invention.

What is claimed is:

1. A method of generating an improved vertical resolution log profile signal p(z) encoding various characteristics of a geophysical formation using a well logging system, said well logging system comprising surface equipment, a nuclear well logging tool, and a cable connecting the nuclear well logging tool to the surface equipment, said geophysical formation being penetrated by a well borehole, said method comprising the steps of:

(a) disposing the nuclear well logging tool within the well borehole;

(b) generating a depth signal representative of the depth (z) of the nuclear well logging tool within the well borehole;

(c) transmitting a nuclear signal into the geophysical formation, said nuclear signal being generated by the nuclear well logging tool, said geophysical formation reflecting at least a portion of the transmitted nuclear signal, said reflected portion referred to as a reflected nuclear signal;

(d) detecting the reflected nuclear signal, said detected nuclear signal encoding various characteristics of the geophysical formation;

(e) generating the improved vertical resolution log profile signal p(z) by:

(i) generating a depth domain logging measurement signal r(z) substantially representative of said various characteristics of the geophysical formation at a particular depth (z), by correlating the detected nuclear signal to the depth signal;

(ii) generating a system response function signal g(z);

(iii) transforming said depth domain logging measurement signal r(z) and said system response function signal g(z) into their spatial frequency domain (f) counterpart signals, R(f) and G(f) respectively via a Fourier transform;

(iv) selecting an appropriate window in the spatial frequency domain based on the R(f) signal, and generating a windowing transfer function signal W(f) representative of said window;

(v) generating a spatial frequency domain profile signal P(f) having the relationship:

$$P(f) = \frac{R(f) \, W(f)}{G(f)}$$

(vi) transforming the spatial frequency domain profile signal P(f) into the improved vertical resolution log profile signal p(z) via an inverse Fourier transform, wherein said improved vertical resolution log profile signal p(z) encodes said various characteristics of the geophysical formation with greater vertical resolution than said depth domain logging measurement signal r(z); and (f) outputting the improved vertical resolution log profile signal p(z) to an output device for recording.

2. The method of claim 1 wherein said system response function signal g(z) is based on a Gaussian function.

3. The method of claim 2 wherein the nuclear well logging tool has a spaced source and detector and the system response function signal g(z) has a width and the width for a particular log is estimated from the distance between the source and detector on said nuclear well logging tool.

4. The method of claim 2 wherein the width of the system response function signal g(z) for a particular nuclear well logging tool is derived from the response of the nuclear well logging tool calibrated in a known logging environment.

5. The method of claim 2 wherein the windowing transfer function signal W(f) is a modified Blackman window having an initial frequency $n_i$ and a cutoff frequency $n_c$.

6. The method of claim 5 wherein $n_i$ and $n_c$ are selected based on the signal R(f).

7. A method of generating an improved vertical resolution log profile signal p(z) encoding various characteristics of a geophysical formation using a well logging system, said well logging system comprising surface equipment, a well logging tool, and a cable connecting the well logging tool to the surface equipment, said geophysical formation being penetrated by a well borehole, said method comprising the steps of:

(a) disposing the well logging tool within the well borehole;

(b) generating a depth signal representative of the depth (z) of the well logging tool within the well borehole;

(c) transmitting a measurement signal into the geophysical formation, said measurement signal being generated by the well logging tool, said geophysical formation reflecting at least a portion of the transmitted measurement signal, said reflected portion referred to as a reflected measurement signal;

(d) detecting the reflected measurement signal, said detected measurement signal encoding various characteristics of the geophysical formation;

(e) generating the improved vertical resolution log profile signal p(z) by:

(i) generating a depth domain logging measurement signal r(z) substantially representative of said various characteristics of the geophysical formation at a particular depth (z), by correlating the received measurement signal to the depth signal;

(ii) generating a system response function signal g(z);

(iii) transforming the depth domain logging measurement signal r(z) and the system response function signal g(z) into their spatial frequency domain (f) counterpart signals, R(f) and G(f) respectively;

(iv) selecting an appropriate window in the spatial frequency domain based on the R(f) signal, and generating a windowing transfer function signal W(f) representative of said window;

(v) generating a spatial frequency domain profile signal P(f) having the relationship:

$$P(f) = \frac{R(f) \, W(f)}{G(f)}$$

(vi) transforming the spatial frequency domain profile signal P(f) into the improved vertical resolution log profile signal p(z), wherein said improved vertical resolution log profile signal p(z) encodes said various characteristics of the geophysical formation with greater vertical resolution than said depth domain logging measurement signal r(z); and (f) outputting the improved vertical resolution log profile signal p(z) to an output device for recording.

8. The method of claim 7 wherein said well logging tool is a nuclear well logging tool.

9. The method of claim 8 wherein said transforming step (e)(iii) employs a Fourier transform and transforming step (e)(vi) employs an inverse Fourier transform.

10. The method of claim 9 wherein said system response function signal g(z) is based on a Gaussian function.

11. The method of claim 10 wherein the nuclear well logging tool has a spaced source and detector and the system response function signal g(z) has a width and the width for a particular log is estimated from the distance between the source and detector on said nuclear well logging tool.

12. The method of claim 10 wherein the width of the system response function signal g(z) for a particular nuclear well logging tool is derived from the response of the nuclear well logging tool calibrated in a known logging environment.

13. The method of claim 10 wherein the windowing transfer function signal W(f) is a modified Blackman window having an initial frequency $n_i$ and a cutoff frequency $n_c$.

14. The method of claim 13 wherein $n_i$ and $n_c$ are selected based on the signal R(f).

* * * * *